United States Patent [19]
Willinger et al.

[11] Patent Number: 5,964,190
[45] Date of Patent: Oct. 12, 1999

[54] PET SHELTER

[75] Inventors: Jonathan Willinger, Tenafly, N.J.; Vincent A. Baiera, Brooklyn, N.Y.

[73] Assignee: J.W. Holding Corp., Tanafly, N.J.

[21] Appl. No.: 08/525,834

[22] Filed: Sep. 8, 1995

[51] Int. Cl.⁶ .............................. A01K 1/02; A01K 1/03; F24F 7/00; F24F 7/007
[52] U.S. Cl. .......................................... 119/500; 119/482
[58] Field of Search .................................. 119/500, 484, 119/485, 203, 705, 753, 473, 478, 481, 786, 472, 480, 479, 482, 706, 521, 522, 523, 228, 224, 215, 789, 791; 446/110

[56] References Cited

U.S. PATENT DOCUMENTS

| | | | |
|---|---|---|---|
| 535,779 | 3/1895 | Wilson | 446/110 |
| 1,902,136 | 3/1933 | Mills | 446/110 |
| 3,123,052 | 3/1964 | Marshall | 119/789 |
| 3,436,446 | 4/1969 | Angell, Jr. | |
| 3,512,503 | 5/1970 | Willinger | 119/251 |
| 3,618,568 | 11/1971 | Breeden | 119/482 |
| 3,841,036 | 10/1974 | Johnson | 52/28 |
| 3,918,406 | 11/1975 | Patterson | 119/473 |
| 3,988,403 | 10/1976 | Angell, Jr. et al. | 264/45.5 |
| 4,161,924 | 7/1979 | Welker | 119/482 |
| 4,962,729 | 10/1990 | Barreto et al. | 119/482 |
| 5,394,835 | 3/1995 | Gatta | 119/170 |
| 5,551,371 | 9/1996 | Markey et al. | 119/482 X |
| 5,575,239 | 11/1996 | Bradburn et al. | 119/500 |

FOREIGN PATENT DOCUMENTS

| 1220134 | 5/1960 | France | 119/482 |
|---|---|---|---|

*Primary Examiner*—Robert P. Swiatek
*Assistant Examiner*—Yvonne Abbott
*Attorney, Agent, or Firm*—Helfgott & Karas, P.C.

[57] ABSTRACT

A compact shelter includes a base and a plurality of interchangeable roofs mountable to the base. A flat roof may be provided with a railing and a series of steps leading to ground level to provide a pet with easy access to a raised resting area. A sliding front door and sliding internal partitions may be used to subdivide the shelter into a plurality of internal compartments. An improved cross ventilation system is provided along with a no-tangle leash assembly. Sloped floors leading to a drainage aperture facilitate cleaning and flushing of the shelter.

22 Claims, 5 Drawing Sheets

PET SHELTER

BACKGROUND OF THE INVENTION

1. Field of the Invention

The present invention relates generally to animal dwellings and in particular to portable, cratable multi-function dwellings adapted to comfortably and safely house an animal such as a dog.

2. Description of Prior Developments

Small buildings for housing and protecting animals are well known and have been in use for many years. For example, wooden dog houses have been fabricated in various configurations to suit the needs of a pet living in a particular climate. Although these structures serve their purpose adequately, the wood construction results in a heavy product which is ill-suited for shipping. Moreover, wood is subject to rapid deterioration from the elements and generally requires considerable construction effort to cut and assemble the numerous wooden structural elements which form a conventional dog house.

In recent years, injection molded plastic animal shelters have appeared which are generally resistant to weathering and which facilitate assembly. Nevertheless, additional needs have remained unmet by these conventional designs.

In particular, a need presently exists for an animal shelter which provides a protected open air resting area for a pet such as a dog.

Another need exists for an animal shelter which is particularly adapted for facilitating the house training of an animal and which can be internally partitioned to ensconce the animal by means of one or more sliding walls to limit the movement of the animal during house training.

Still another need exists for an animal shelter which provides substantial internal ventilation, and in particular, cross ventilation for cooling an animal during warm weather.

Another need exists for an animal shelter which facilitates internal cleaning and which directs cleaning and flushing liquids such as hose water to a rear external portion of the shelter.

Another need exists for an animal shelter which includes integral food and water containers formed during molding of the shelter.

Another need exists for an animal shelter which provides a simple, inexpensive leash mounting.

Yet another need exists for an animal shelter which is assembled from modular components which provide various shelter configurations using a common base.

SUMMARY OF THE INVENTION

The present invention has been developed to fulfill the needs noted above and therefore has as an object the provision of an animal shelter which is easily constructed, modular in assembly, lightweight, and which provides multiple features and functions for adding significant value to the shelter.

Another object of the invention is to provide an animal shelter which provides an above ground, open air resting place for an animal so as to protect the animal from mud, dirt and insects such as fleas and ticks.

Still another object of the invention is to provide an animal shelter which is easy to clean and which directs and flushes cleaning liquids to a predetermined rear portion of the shelter.

Yet another object of the invention is to provide an animal shelter which includes a common base adapted to receive several different wall and roof assemblies so as to provide a selection of shelter designs with a minimum of parts and inventory.

These and other objects are met by the present invention which is directed to an injection molded animal shelter which includes numerous features and conveniences integrally formed during molding. A single floor or base is adapted to mate with several different wall and roof structures to provide various shelter designs.

The roof or upper portion of the shelter may be formed with a flat deck area which allows an animal to perch or rest above the ground within the perimeter of the shelter per se. This is particularly desirable where the area surrounding the shelter is dirty, muddy or infested with insects. Moreover, the raised deck-roof allows an animal to safely stretch outside of the shelter in those cases where there is limited clearance space surrounding the shelter.

One or more steps may be provided along the rear wall of the shelter to facilitate access to the deck-roof platform. This feature is particularly desirable for older pets which may have a problem with jumping directly up onto the deck-roof.

Food and water receptacles may be molded integrally along the external walls of the shelter so as to eliminate the possibility of losing a loose food or water bowl and to hold the bowls steady during use. Alternately, food and water bowl receptacles may be molded integrally with the shelter walls to removably receive detachable food and water bowls. This removable bowl feature facilitates the cleaning of the bowls.

In order to adapt the shelter for ensconcing an animal for house training purposes, a door cover is provided in the form of a separate sliding cover or as a permanently attached or removable hinged door. The interior of the shelter may be selectively partitioned with sliding walls to limit the freedom of an animal during house training.

In order to provide adequate interior ventilation, ventilation slots are provided along opposed side walls or roof portions to enable air to flow freely through the shelter so as to provide cross ventilation.

A removable leash holder having a driving stake may also be provided which is secured to the shelter by anchoring the driving stake into the ground through a recess or fitting provided along an exterior wall of the shelter. A leash may be provided which has a length less than the length of the exterior perimeter of the shelter so as to prevent an animal from wrapping the leash around the shelter and becoming entangled.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings.

In the various figures of the drawings, like reference characters designate like parts.

DETAILED DESCRIPTION OF THE PREFERRED EMBODIMENTS

Figure 1:
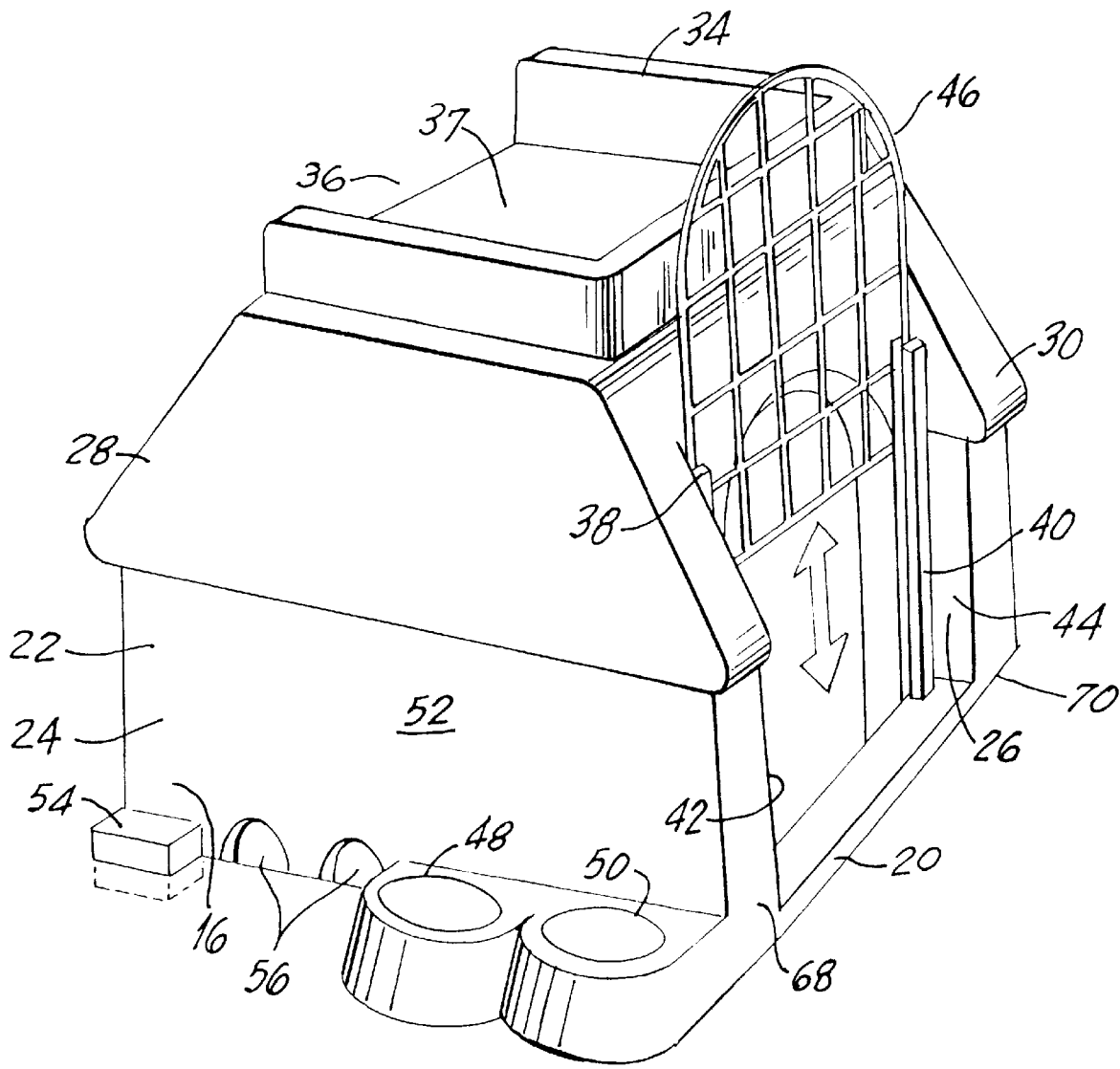
FIG. 1 is a perspective view of an animal shelter constructed in accordance with the invention and depicting the details of a removable door.

The present invention will now be described in conjunction with the drawings, beginning with FIG. 1, which shows an animal shelter 10 adapted for sheltering an animal such as a dog. Shelter 10 is preferably constructed from plastic injection molded components which provide a sturdy yet lightweight construction which is resistant to deterioration from exposure to the outdoors.

Figure 5:
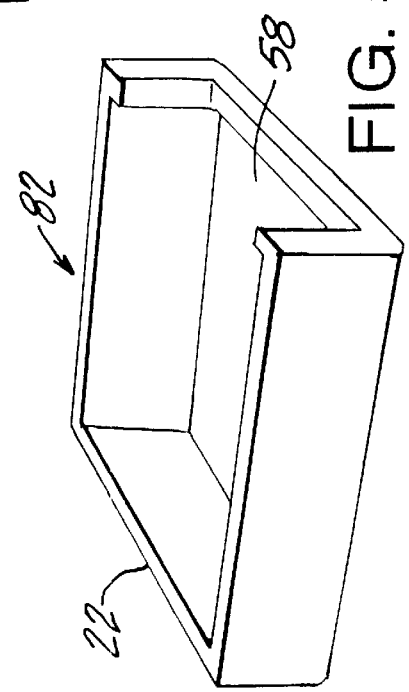
FIG. 5 is a perspective view of the modular base portion of FIGS. 3 and 4.

The shelter includes a front wall or entrance side 12 within which an arched entrance or opening 14 is formed during molding. Front wall 12 is bordered on opposite sides by flat side walls 16 and 18 and opposed by a flat rear wall 22 (FIG. 5). A step 20 is molded along the bottom of opening 14 for providing added rigidity to the structure.

Side walls 16 and 18 include generally rectangular shaped lower portions 24,26 and trapezoidal shaped upper portions 28,30 which extend upwardly and join a flat deck-roof 32. Deck-roof 32 may be formed with a three-sided free standing railing or wall defining an enclosure 34 extending over the front wall and sidewalls and defining an opening 36 extending over the rear wall 22.

The front entrance 14 is bordered on opposite sides by a pair of vertically extending grooves or slide tracks 38,40 formed along the inner faces 42,44 of side walls 16,18. A vertically sliding front door 46 in the form of an arched grill is mounted within slide tracks 38,40 with a free sliding fit. Although door 46 is in the form of an arched grill, a plurality of different shaped interchangeable vertically sliding doors complimentary with and mountable within slide tracks 38,40 may be used.

Door 46 may be completely removed from the tracks 38,40 or fixed in a closed position for shipping. Instead of a sliding door, a hinged door could be used, either detachably mounted or permanently mounted to the shelter 10.

One or more bowls or receptacles 48,50 are molded along the outer face 52 of the lower rectangular portion 24 of side wall 16. Bowls or receptacles 48,50 are provided for holding food and water for an animal. Rather than place food and water directly within the receptacles, removable bowls may be provided which nest within the receptacles and can be removed for easy cleaning. Because bowls 48,50 project outwardly from side wall 16 and rest on the ground, they add to the stability of shelter 10 by resisting tipping.

Additional stability may be provided by forming one or more foot pads 54 along the outer faces of side wall 16,18, back wall 22 and/or front wall 12, preferably at the corners.

One or more drainage ports 56 may be formed at the bottom of side wall 16 for draining cleaning liquids from the interior of the shelter 10. The floor 58 (FIG. 5) of the shelter is preferably slanted or banked downwardly toward the drainage holes 56 to allow for a complete and automatic elimination of cleaning water. Although the drainage holes 56 may be formed along the bottom of any wall, it is preferable to form them toward the rear of the shelter so as to avoid the formation of mud or the deposition of dirt and debris directly in front of the front entrance 14.

Figure 2:
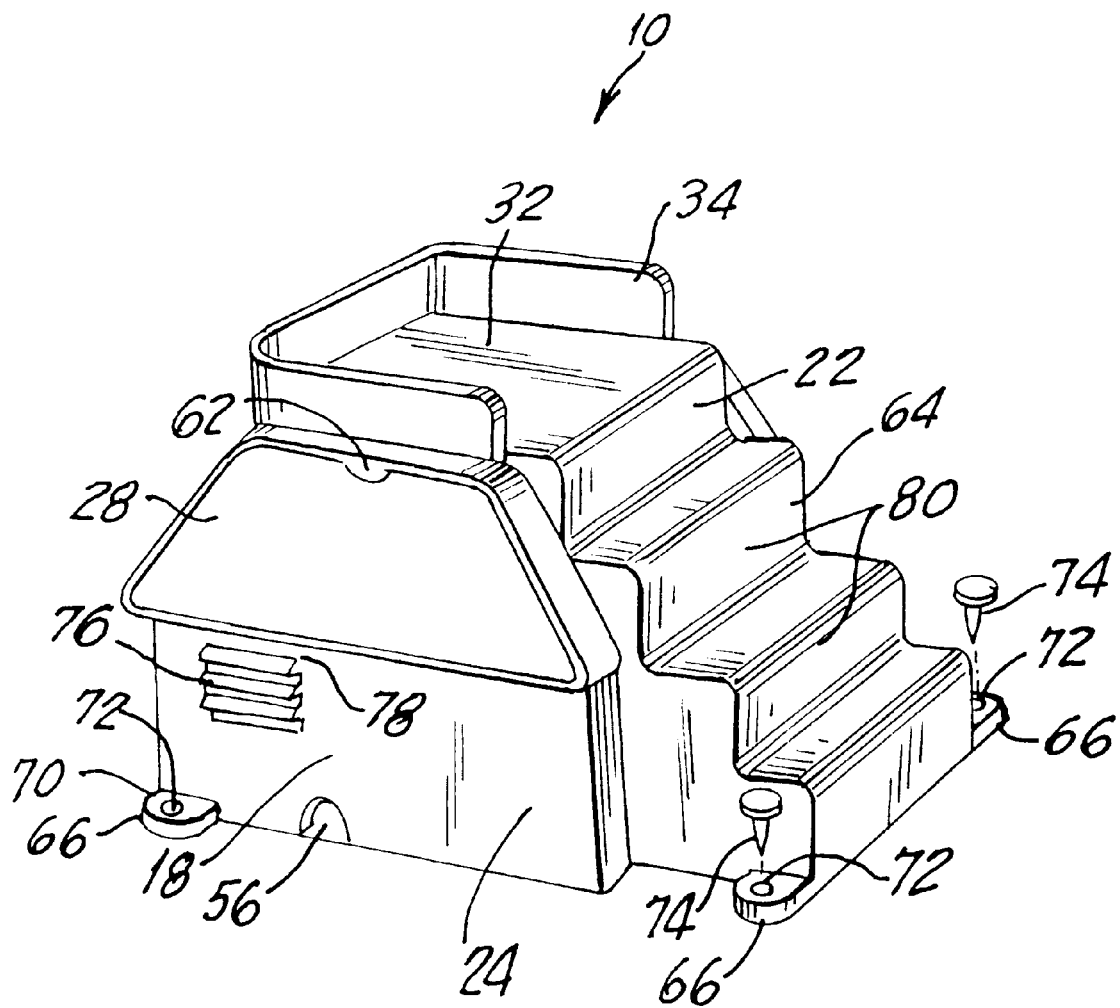
FIG. 2 is a perspective view of an alternate embodiment of the invention provided with rear steps and a deck-roof.

As seen in FIG. 2, one or each of the upper trapezoidal portions 28,30 of side walls 16,18 may be detachably mounted to the adjacent rectangular lower portions 24,26 by any suitable connection such as a tongue and groove connection or a projection formed on one side wall portion and a complementary recess formed on the other. The phantom line 60 in FIG. 2 schematically represents a rectangular projection on upper trapezoidal portion 28 snugly fit within a complementary recess formed in the lower rectangular portion 24.

An additional releasable connection may be provided between the top of the inner faces of the trapezoidal portions 28,30 and the side end walls of deck-roof 32. Instead of a fully removable wall portion, a hinged wall portion in the nature of a trap door could be substituted for portions 28,30 with a hinge attached between lower portions 24,26 and the upper portions 28,30.

By removing the trapezoidal side wall portion 28, such as by engaging and lifting along finger grip 62, the interior of the shelter is fully accessable and may be easily hosed down and flushed out. Moreover, the removable side wall portion allows for full visual inspection of the interior of the shelter as well as any animal located therein.

A series of molded steps 64 is formed behind and leads up to the rear wall 22 as further shown in FIG. 2. Steps 64 provide easy access to the deck-roof 32 which provides a safe and clean resting area. Enclosure 34 forms a three-sided railing which provides security for a resting animal.

In place of or combined with foot pads 54, stake down tabs 66 may be formed at the bottom corners of steps 64 and adjacent the front corners 68,70 (FIG. 6) of side walls 16,18. Tabs 66, which project outwardly from the shelter, include apertures 72 for receiving stakes 74 for securing the shelter 10 to the ground.

In order to provide adequate cross ventilation through the interior of the shelter, a series of ventilation slots 76 is formed in each side wall 16,18 as further shown in FIG. 2. Slots 76 may be molded into the side walls 16,18 and formed with downwardly sloping overhanging ridges 78 which project outwardly from the sidewalls. Ridges 78 limit the amount of precipitation entering the interior of the shelter. Slots 76 may also be formed in one or more of the vertical faces 80 of steps 66 for further cross ventilation.

Figure 4:
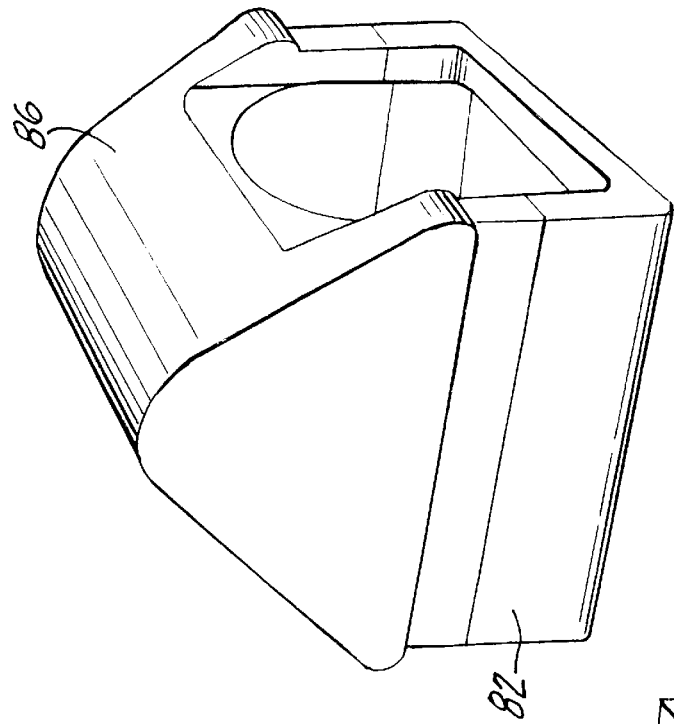
FIGS. 3 and 4 are perspective views of other modular embodiments of the invention.
Figure 3:
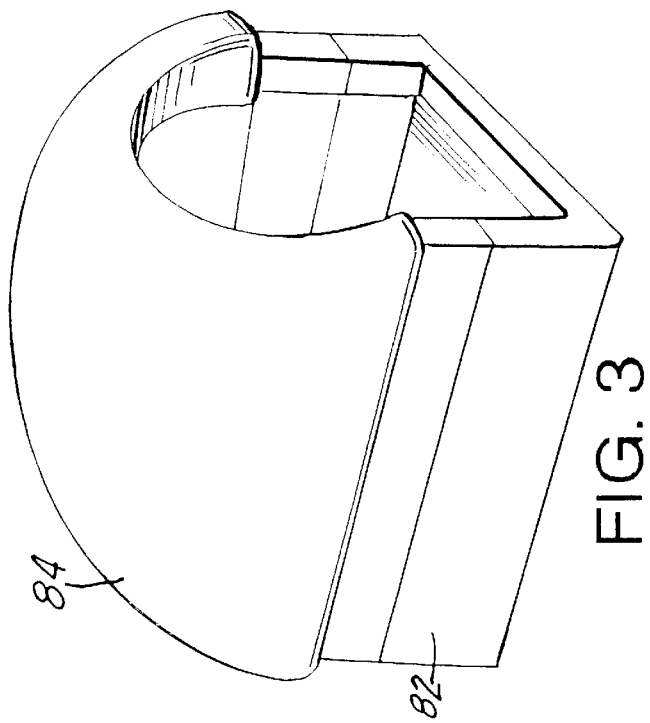

As shown in FIGS. 3, 4 and 5, a common, generally rectangular base 82 may be molded as a separate component of manufacture as detailed in FIG. 5 and assembled to various different interchangeable roofs. For example, a generally domed roof 84 may be used with base 82 as seen in FIG. 3 or a centrally ridged roof 86 may be used as seen in FIG. 4. In these embodiments, the roofs 84,86 may be cemented or otherwise permanently attached to base 82. Alternatively, an interengaged complementary friction fit may be used to allow free interchange of various roofs.

Figure 6:
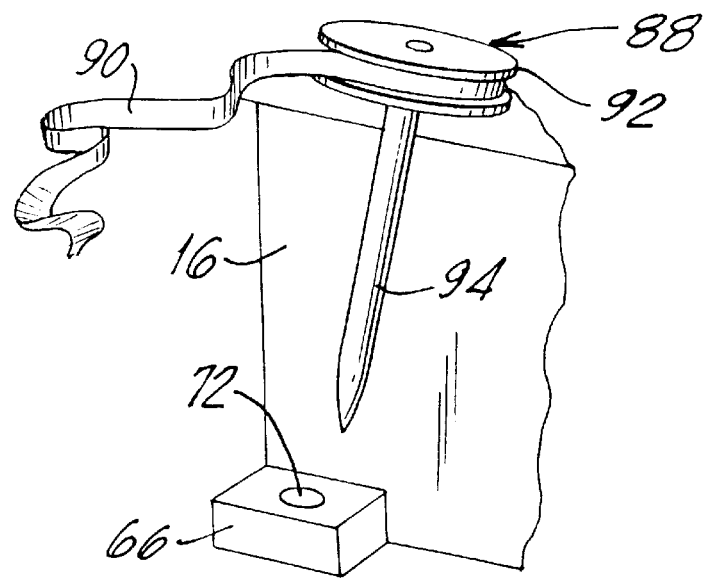
FIG. 6 is a perspective view of a dog leash assembly adapted for use with the present invention.

A leash assembly 88 is shown in FIG. 6 wherein a leash 90 is shown wrapped around a spool 92 mounted on stake 94. The leash assembly 88 is secured to the shelter 10 by driving stake 94 through one of the apertures 72 of one of the stake down tabs 66. In this manner, the shelter is also staked in place.

The leash 90 may be limited in length to prevent tangles. For example, leash 90 may be limited in length to less than the length of the outside perimeter of the shelter and preferably less than the length of three sides of the shelter. It is possible to retractably mount leash 90 to spool 92 with a light coil spring mounting of the type commonly used with measuring tapes so as to further reduce leash tangling.

Figure 7:
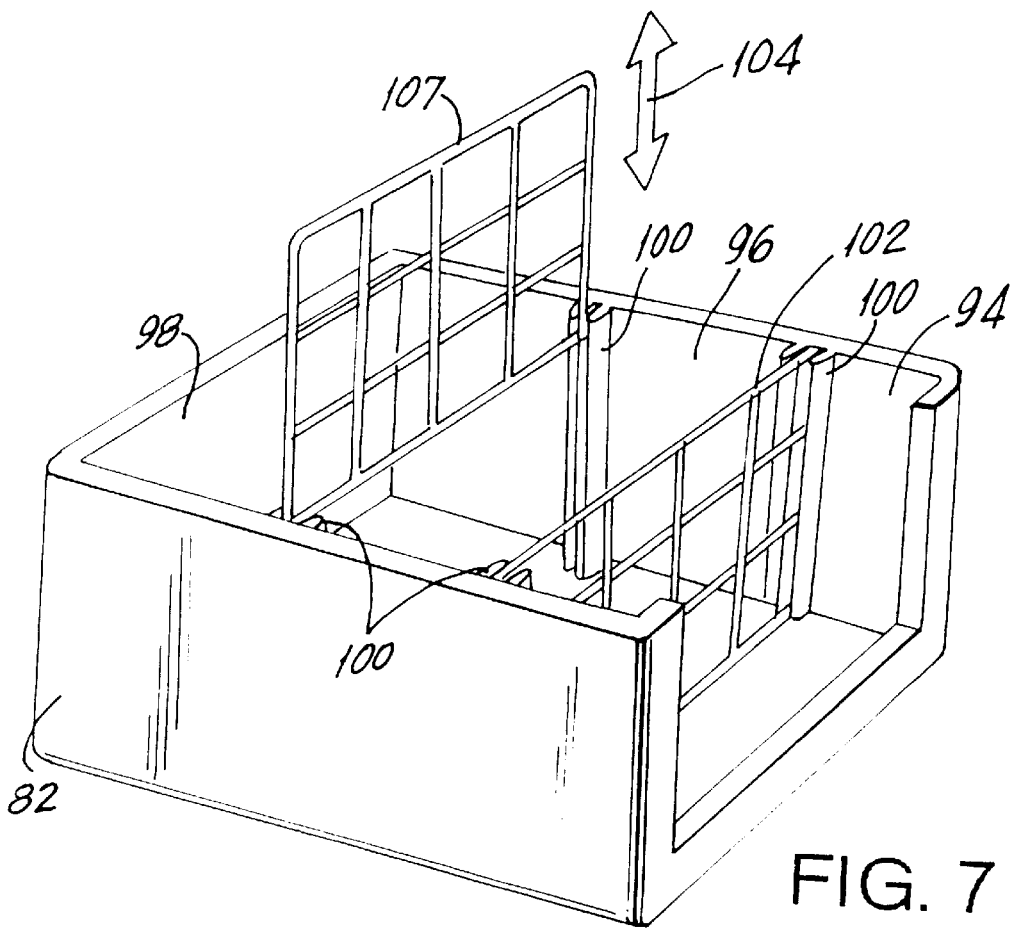
FIG. 7 is a perspective view of another embodiment of a modular base constructed in accordance with the invention and provided with internal partitions.

The interior of the shelter 10 may be divided into two or more compartments 94,96,98 as shown in FIG. 7. Base 82 is formed with internal grooves or slide tracks 100 which receive internal partitions 102 which may be in the form of an open grid as shown, or in the form of solid panels. Directional arrow 104 shows the manner in which a partition 102 is inserted and removed from tracks 100. Compartments 94,96,98 provide separate chambers for separating two or more animals or for limiting the space provided to a single animal.

Figure 8:
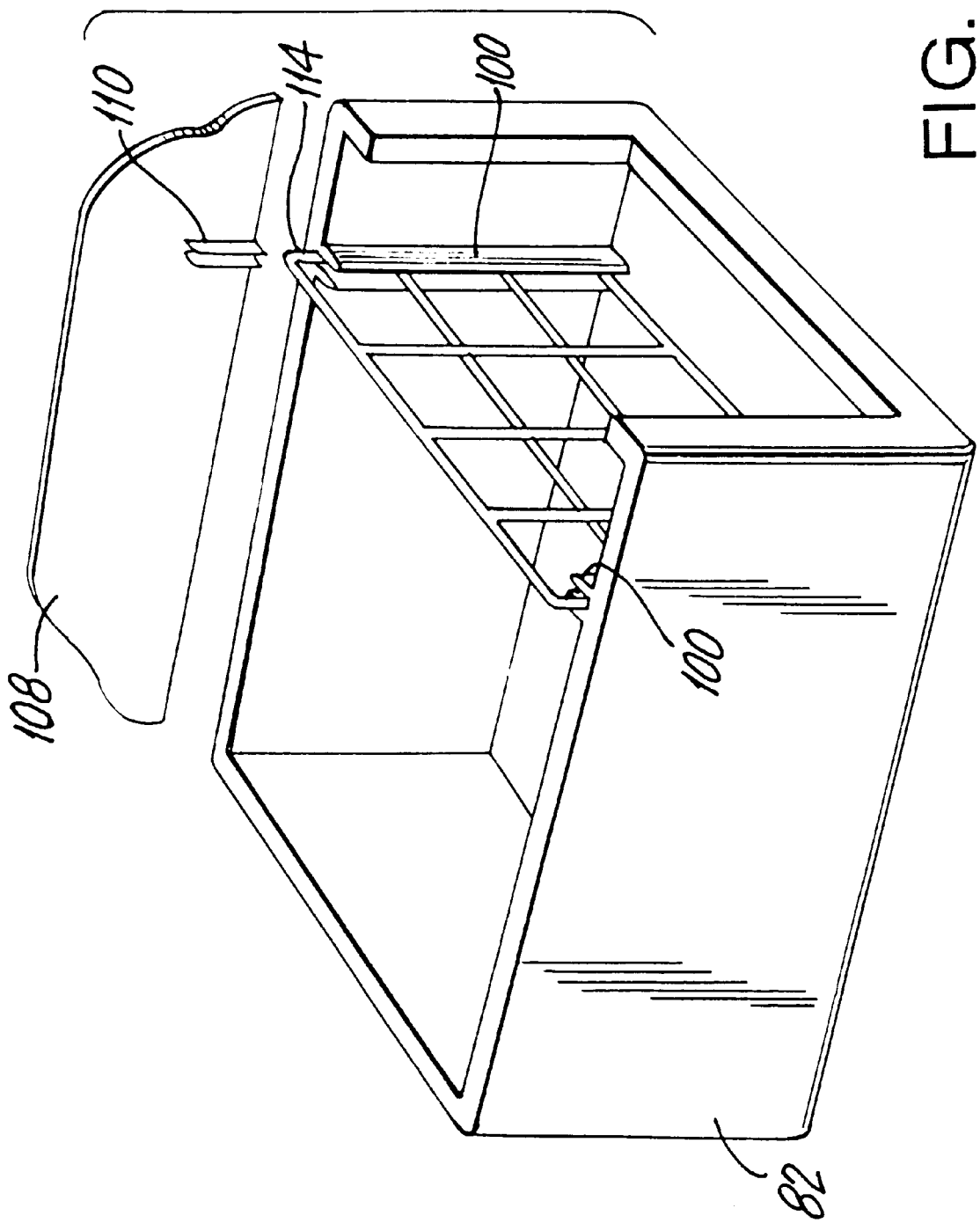
FIG. 8 is a perspective view of another embodiment of the modular base showing also a fragmented view of a roof constructed in accordance with the invention and provided with internal partitions and complementary slide tracks in the base and roof.

As shown in FIGS. 3, 4 and 5, in other embodiments the animal shelter may be assembled to accept various interchangeable roofs 84, 86. Similarly, as shown in FIG. 8, interchangeable roofs 108 may be formed with internal grooves or slide tracks 110 which are designed to receive the vertically upward extending portion 114 of the internal partitions along the same axis as the internal groves or slide tracks formed in the base.

There has been disclosed heretofore the best embodiment of the invention presently contemplated. However, it is to be understood that various changes and modifications may be made thereto without departing from the spirit of the invention.

What is claimed is:

1. A pet shelter for an animal, comprising:
   a base having a plurality of molded plastic walls, said base defining a chamber adapted to accommodate said animal;
   at least one of said plurality of walls defining an entrance into said chamber;
   a roof supported by said plurality of walls and extending atop of said chamber; and
   one or more molded plastic steps disposed over substantially the entire width of one of said plurality of walls, said steps leading to and providing access to said roof.

2. The shelter of claim 1, wherein said roof comprises a flat roof.

3. The shelter of claim 2, further comprising a wall at least partially surrounding said flat roof.

4. The shelter of claim 1, further comprising a drainage port formed in one of said plurality of walls.

5. The shelter of claim 1, further comprising at least one bowl formed with and projecting outwardly from one of said plurality of walls.

6. The shelter of claim 1, wherein said plurality of walls comprises a side wall having a lower portion and a removable upper portion.

7. The shelter of claim 1, comprising a means for removing said roof for facilitating internal cleaning of said shelter.

8. The shelter of claim 1, further comprising a plurality of ventilation slots formed in at least two of said plurality of side walls.

9. The shelter of claim 1, further comprising one or more partitions removably mounted within said shelter.

10. The shelter of claim 1, further comprising a stake down tab extending from one of said side walls and having an aperture formed therein and a leash assembly insertable through said aperture.

11. The shelter of claim 10, wherein said leash assembly comprises a spool mounted on a stake for inserting through said aperture for anchoring into ground.

12. The shelter of claim 1, further comprising a ventilation port formed in each one of at least two of said plurality of walls.

13. The shelter of claim 12 wherein each said ventilation port is molded within each one of said plurality of walls.

14. The shelter of claim 12, wherein said ventilation port comprises a plurality of downwardly sloping ridges.

15. A shelter for an animal, comprising:
   a base molded as a unitary piece having a plurality of molded plastic walls for defining a chamber adapted to accommodate said animal;
   a roof supported by said plurality of molded plastic walls, said roof having an open ended perimeter wall;
   an entrance extending between two of said plurality of molded plastic walls; and
   a slideable door extending across said entrance.

16. The shelter of claim 15, further comprising a pair of slide tracks extending vertically along opposite sides of said entrance for guiding and retaining said slidable door.

17. The shelter of claim 15, wherein said slidable door comprises an open grid.

18. A shelter for an animal, comprising:
   a base molded as a unitary piece having a plurality of molded plastic walls for defining a chamber for said pet; and
   a plurality of different shaped interchangeable roofs complementary with and mountable to said base.

19. The shelter system of claim 18, wherein one of said roofs comprises a domed roof and another of said roofs comprises a ridged roof.

20. A shelter for an animal, comprising:
   a base having a plurality of walls and at least one pair of opposing slide tracks mounted to a first and second opposing wall of said plurality of walls;
   a roof supported by said base and having an open ended perimeter wall; and
   at least a pair of removable partitions extending between said first and second walls and engaging said slide tracks for dividing said base into one or more compartments.

21. A shelter of claim 20, wherein said roof comprises opposing slide tracks oriented along the same vertical axis as said base opposing slide tracks.

22. A shelter of claim 21, wherein said removable partitions extend vertically upward beyond said base for engaging said roof slide tracks.

* * * * *